US010436955B2

(12) United States Patent
Dasbach

(10) Patent No.: US 10,436,955 B2
(45) Date of Patent: Oct. 8, 2019

(54) TEMPERATURE- AND CORROSION-STABLE SURFACE REFLECTOR

(71) Applicant: ALMECO GmbH, Bernburg (DE)

(72) Inventor: Reinhard Dasbach, Bernburg (DE)

(73) Assignee: ALMECO GMBH, Bernburg (DE)

(*) Notice: Subject to any disclaimer, the term of this patent is extended or adjusted under 35 U.S.C. 154(b) by 0 days.

(21) Appl. No.: 15/522,456

(22) PCT Filed: Oct. 23, 2015

(86) PCT No.: PCT/EP2015/074674
§ 371 (c)(1),
(2) Date: Apr. 27, 2017

(87) PCT Pub. No.: WO2016/066562
PCT Pub. Date: May 6, 2016

(65) Prior Publication Data
US 2017/0315276 A1 Nov. 2, 2017

(30) Foreign Application Priority Data

Oct. 27, 2014 (DE) .................. 10 2014 115 602
Feb. 20, 2015 (DE) .................. 10 2015 102 496

(51) Int. Cl.
G02B 5/08 (2006.01)

(52) U.S. Cl.
CPC ......... G02B 5/0875 (2013.01); G02B 5/0858 (2013.01); Y02E 10/52 (2013.01)

(58) Field of Classification Search
CPC ...... G02B 5/0858; G02B 5/0875; Y02E 10/52
(Continued)

(56) References Cited

U.S. PATENT DOCUMENTS 4,093,349 A * 6/1978 Mills ..................... B32B 15/018
204/192.12
5,019,458 A 5/1991 Elgat et al.
(Continued)

FOREIGN PATENT DOCUMENTS

DE 930428 7/1955
DE 33 07 661 9/1984
(Continued)

OTHER PUBLICATIONS

International Search Report for PCT/EP2015/074674 dated Jan. 21, 2016.
(Continued)

Primary Examiner — Jade R Chwasz
(74) Attorney, Agent, or Firm — Hunton Andrews Kurth LLP

(57) ABSTRACT

The present invention relates to a layer system, comprising a metallic substrate (1) having the following layers applied on a side (A) thereof from the inside to the outside in the specified order: 4) a layer composed of a material selected from among substoichiometric oxides and oxynitrides of titanium and zirconium or from among metals, selected from among titanium, zirconium, molybdenum, platinum, and chromium or an alloy using one of these metals or of at least two of these metals, 5a) a layer composed of a nickel alloy having chromium, aluminum, vanadium, molybdenum, cobalt, iron, titanium, and/or copper as an alloying partner, or composed of a metal selected from among copper, aluminum, chromium, molybdenum, tungsten, tantalum, titanium, platinum, ruthenium, rhodium, and alloys using one of these metals, or of at least two of these metals, or composed of iron, steel or stainless steel, provided the layer may only consist of aluminum if the reflector layer 6) is formed of aluminum and that, in this case, the aluminum of layer 5a) has been sputtered, 6) an optically dense, high-purity metal (Continued)

reflector layer, 7) a layer selected from among substoichiometric oxides of titanium, zirconium, hafnium, vanadium, tantalum, niobium or chromium and from among metals selected from among chromium, titanium, zirconium, hafnium, vanadium, niobium, tantalum, tungsten, molybdenum, rhodium, and platinum and alloys using one of these metals or at least two of these metals, 9) a layer having a low refractive index ("LI layer") in relation to a directly adjoining layer 10) ("HI layer"), and 10) a layer directly adjoining layer 9) and having a higher refractive index ("HI layer") in relation to layer 9) ("LI layer"). The layer system can be used, e.g. as a surface reflector, preferably in applications with LEDs, particularly MC-COB for LEDs, as a solar reflector or as a laser mirror, in particular for color wheels in DLP laser projectors.

29 Claims, 5 Drawing Sheets

(58) Field of Classification Search
USPC ............ 359/350, 514, 602–608, 838, 884
See application file for complete search history.

(56) References Cited

U.S. PATENT DOCUMENTS

| | | | |
|---|---|---|---|
| 5,527,562 | A | 6/1996 | Balaba et al. |
| 5,589,280 | A | 12/1996 | Gibbons et al. |
| 6,078,425 | A | 6/2000 | Wolfe et al. |
| 6,222,207 | B1 | 4/2001 | Carter-Coman et al. |
| 6,593,160 | B2 | 7/2003 | Carter-Coman et al. |
| 7,678,459 | B2 | 3/2010 | Scott et al. |
| 9,140,832 | B2* | 9/2015 | Medwick ............ G02B 5/0858 |
| 10,001,588 | B2 | 6/2018 | Ballou |
| 2002/0076568 | A1 | 6/2002 | Reichert et al. |
| 2006/0141272 | A1* | 6/2006 | Wolfe ................ G02B 5/0858 |
| | | | 428/457 |
| 2009/0220802 | A1 | 9/2009 | Faber et al. |
| 2009/0233037 | A1* | 9/2009 | Medwick ............ C03C 17/36 |
| | | | 428/68 |
| 2012/0145219 | A1* | 6/2012 | Medwick ............ C23F 13/10 |
| | | | 136/246 |
| 2012/0257295 | A1* | 10/2012 | Kumagai ............ G02B 5/0858 |
| | | | 359/884 |
| 2013/0342900 | A1* | 12/2013 | Koeckert ............ F24S 23/82 |
| | | | 359/360 |
| 2014/0240821 | A1* | 8/2014 | Ballou ................ G02B 5/0858 |
| | | | 359/360 |
| 2014/0340741 | A1* | 11/2014 | Adachi ................ B32B 15/08 |
| | | | 359/360 |
| 2018/0259688 | A1* | 9/2018 | Ballou ................ G02B 5/0858 |

FOREIGN PATENT DOCUMENTS

| | | |
|---|---|---|
| DE | 102004010689 | 6/2005 |
| DE | 10200500911 | 7/2006 |
| DE | 102006030094 | 8/2007 |
| DE | 202011050976 | 1/2013 |
| DE | 10 2015 102 496 A1 | 4/2016 |
| EP | 0 104 870 | 4/1984 |
| EP | 0 456 488 | 11/1991 |
| EP | 0 918 234 | 4/2002 |
| EP | 0 762 152 | 1/2003 |
| EP | 0 583 871 | 1/2004 |
| EP | 1 174 397 | 9/2008 |
| EP | 2 418 521 | 2/2012 |
| EP | 2 530 496 | 12/2012 |
| JP | S61-028903 | 2/1986 |
| JP | H08-292308 | 5/1996 |
| JP | 2000-349349 | 1/2001 |
| JP | 2014-502373 | 1/2014 |
| JP | 2015-502559 | 1/2015 |
| WO | 2006033877 | 3/2006 |
| WO | 2007095876 | 8/2007 |
| WO | 2012036720 | 3/2012 |

OTHER PUBLICATIONS

T. Fend et al., Applicability of Highly Reflective Aluminium Coil for Solar Concentrators, Solar Energy (2000) vol. 68, No. 4, pp. 361-370.

* cited by examiner

TEMPERATURE- AND CORROSION-STABLE SURFACE REFLECTOR

CROSS-REFFERENCE TO THE RELATED APPLICATIONS

This patent application is a U.S. National Stage filing of International Patent Application No. PCT/EP2015/074674, filed Oct. 23, 2015, which claims priority to German Patent Application No. DE 10 2015 102 496.9, filed Feb. 20, 2015, and German Patent Application No. DE 10 2014 115 602.1, filed Oct. 27, 2014, the disclosure of each which are hereby incorporated by reference in their entireties.

FIELD OF THE INVENTION

The present invention relates to a temperature-resistant layer system having a high reflectivity in the wavelength range between 300 and 2700 nm, which is arranged on a metallic substrate and comprises a metallic mirror layer or reflector layer having a reflection-enhancing "alternating layer system" arranged above that which is composed of a dielectric LI layer (low-index layer) having a refractive index $n1$ and a dielectric HI layer (high-index layer) arranged thereon having a higher refractive index $n2$ than $n1$, and the application thereof as a temperature resistant and corrosion resistant surface reflector. Between said substrate and said reflector layer there is at least one layer which is provided for improving the adhesion of said metallic layer of the mirror and also as a diffusion barrier and which inhibits the diffusion of atoms from the substrate into the reflector layer and of atoms from the reflector layer into the substrate. At the high temperatures arising in the intended uses of the surface reflector, such a diffusion would otherwise be intensified and accelerated which would result in a decrease of reflectance of the reflector layer or mirror layer. In order to improve the temperature stability, further protective layers which, as the case may be, also suppress the agglomeration of the reflector layer, are provided between said diffusion layer and said reflector layer. For improving the temperature stability and corrosion resistance, protective layers are also provided between the reflector layer and the LI/HI layer system which protect the reflector layer against oxidation, agglomeration, and diffusion into the overlying layers. The layers of the layer system according to the invention are formed so as to adhere well to each other or to the substrate and for the surface reflector to have good abrasion resistance and corrosion resistance.

STATE OF THE ART

Surface reflectors and comparable objects are frequently manufactured on the basis of aluminum. The raw aluminum should be as pure as possible, for example having a 99.8% degree of purity in order to achieve a high level of reflection. However, since pure aluminum is very soft, so-called roll clad materials are preferably used. To this end, pure aluminum is rolled on one or both sides onto an aluminum alloy having the desired mechanical properties. The high degree of purity is desired because any contained impurities result in pitting during processing, e.g. in degreasing baths, or during electrochemical polishing which would cause an increase of the proportion of diffuse reflection which is not desired in the intended applications.

An unprotected aluminum surface reacts quickly under environmental influences and then has only a moderate reflection: aluminum oxide forms in a dry atmosphere, in humid conditions aluminum hydroxide (bayerite) forms or aluminum metahydroxide (boehmite) forms above 75° C. In addition, the unprotected aluminum surface is very susceptible to scratching. To achieve a high level of reflection and to protect the aluminum surface, the following processing steps are normally conducted: the surface is electrochemically polished by applying a voltage to a chemical bath, whereby the surface becomes smoother due to removal of material and the undefined reaction products are removed so that a pure aluminum surface is obtained, which results in a higher level of reflection with a lower proportion of diffuse reflection. The aluminum treated in this manner is then normally subjected to an anodization process. In this process, a layer containing hydroxy groups grows from the outside towards the inside, i.e. in the direction of the substrate core. A porous aluminum oxide layer is formed. A warm water bath is frequently used to close the pores. This aluminum oxide layer has a much higher mechanical hardness than the unprotected aluminum surface resulting in that the mirror surface is resistant to scratching. It shows undesirable interferences of the reflected light due to the thickness of the aluminum oxide layer of approx. 0.4-2 µm, frequently approx. 0.5 to 2 µm, and furthermore, part of the light is dispersed or absorbed through impurities in the aluminum oxide layer. Thus, the product has a total reflection of only approx. 84 to 90% (according to DIN 5036-3).

The degrees of reflection achieved in this manner are too low for some applications. Therefore, several multi-ply layer systems having a higher degree of reflection were proposed in the state of the art, which can be deposited using a suitable combination of metallic and transparent—primarily dielectric—layers by means of well-known thin film coating processes, such as PVD, CVD or PECVD. Thus, for example, EP 0 456 488 A1 and EP 0 583 871 A1 disclose that the total reflectivity of a mirror layer system can be increased by applying a dielectric LI/HI layer system made of layers having an alternately low and high refractive index onto a metallic reflection layer. If these are deposited on metallic substrates having a relatively low mechanical hardness, these layer systems are very sensitive to mechanical damage—even if many of the dielectric layers normally used have a very high level of hardness. In the case of a mechanical impact, they can actually be pressed into the soft metal surface. Therefore, it is preferable to deposit these layer systems onto an anodized aluminum surface having a high level of hardness. The reflectors manufactured in this manner are considerably less sensitive to mechanical damage.

To increase the reflection and to inhibit the undesired interferences, the aluminum oxide layer is initially coated with a so-called mirror layer or reflector layer made of a metal. This layer must have a thickness that makes the layer "optically dense", thereby preventing incident radiation from penetrating through the layer and reaching the underlying layers and thus potentially causing interference effects in the aluminum oxide layer. This would reduce the efficiency of the mirror and cause undesirable interference colors. The application of an organosilicon sol is suggested as a basis for a PVD coating in U.S. Pat. No. 5,527,562 and the application of a varnish on the aluminum substrate is recommended in EP 0 918 234 B1 allowing to omit the anodization layer. However, EP 0918 234 B1 does not refer to any adhesive layer that must be applied to the anodization layer prior to depositing the reflector layer. High-purity aluminum or silver frequently serve as the material for the reflector layer because both materials already have a high intrinsic degree of reflection.

WO 2007/095876A1 refers to an adhesive layer that is applied on the anodization layer before a first functional reflector layer having a thickness <90 nm is applied, which is not optically dense. A second adhesion-promoting layer is applied thereon before a second functional reflector layer is applied by means of electron beam evaporation. The intention is to produce an optically dense reflector layer system by combining both of these non-optically dense reflector layers. The intended advantage is that the second reflector layer can then be applied by means of electron beam evaporation. Without the first functional reflector layer, an optically dense reflector layer would only be able to be deposited by means of a sputtering process.

To still increase the reflection of the metal layer, in the art, a layer system of transparent materials is normally arranged above the reflector layer while applying thicknesses which cause a constructive interference of the reflected light, whereby the reflection of the metal layer is further increased and, in addition, the reflector layer is protected against environmental influences. Since these layers are substantially thinner than the aluminum oxide layers produced through anodization, undesirable interferences are largely avoided. Normally this system consists of the lower layer previously mentioned above having a lower refractive index (LI layer) and an upper layer having a higher refractive index (HI layer). The materials usable for this are well known; a common layer pair consists of silicon oxide for the LI layer and titanium dioxide for the HI layer. Furthermore, by providing these layers and by precisely coordinating the layer thicknesses, a desired high reflection is achieved for incident radiation in the range between 300 and 2700 nm. For this type of mirror with the sequence—glass/aluminum/ $SiO_2/TiO_2$—WO 2006/033877 suggests applying a metal oxide layer, particularly an aluminum oxide layer, under the aluminum layer to improve the adhesion of the aluminum to the glass and to the dielectric overlay, and thus ultimately to improve the mechanical properties. This layer may be graded such that the aluminum content increases in the direction of the aluminum layer and the oxygen content increases in the direction of the substrate. This type of aluminum oxide layer may also be arranged between the aluminum layer and the dielectric overlay. In an alternative described in U.S. Pat. No. 7,678,459, an optionally graded $SiAlO_x$ is used in place of aluminum oxide.

The objective of most of these proposed reflector layer systems is to achieve as high of a reflection as possible in the range of visible light in order to use it as a reflector for lighting purposes. A special temperature or corrosion resistance is normally not required.

According to EP 0 762 152, a thin eloxal layer which should have a thickness of no more than 75 nm is simultaneously used as protection against mechanical and chemical influences and as a low-refractive layer of the LI/HI layer system, i.e., for example, as a replacement for $SiO_2$. These reflectors should be suitable "particularly as reflectors for infrared radiation or for lights in light technology and especially in daylight technology".

With some applications, the reflector layer systems may be exposed to high temperatures during continuous operation, for example, when used as solar mirrors, mirrors for high-power radiators (e.g. floodlights), as laser mirrors or as substrates for LED chips.

In this regard, the metallic reflector layer may oxidize or the atoms of the reflector layer may diffuse into the layers applied above or below. Furthermore, agglomeration of silver may occur, particularly if it is used as a reflector layer, which will cause the reflection of the layer system to decrease.

Due to high temperatures, the components of the adhesive layers or the optical layers above the reflector layer may diffuse into the reflector layer. These effects normally cause an undesirable decrease of reflectivity of the reflector layer system.

Thus, for example, solar mirrors are frequently used for Fresnel power plants. In this regard, e.g. primary mirrors can capture sunlight and condense it on absorber tubes that are filled with a fluid capable of being heated. To increase the yield of the sunlight, a second mirror (secondary mirror) is frequently mounted behind the absorber tube. It is situated in close proximity to the tube and becomes very hot; it must withstand temperatures of approx. 250° C. to 300° C. during continuous operation. Under these conditions, the reflector layers are not stable for very long for the reasons mentioned above. To remedy this, EP 2 418 521 A2 proposes omitting the reflector layer. In order for this to be achieved, the substrate itself or in conjunction with overlying layers must have the desired reflective properties. This is achieved through the use of electrochemically polished, high-purity aluminum as a substrate which is anodized so that a 20 to 100 nm thick, very dense, hard, and non-porous aluminum oxide barrier layer is formed. The normal layer system of LI and HI layers can then be applied by means of the PVD process to obtain a mirror having enhanced heat resistance. To improve the scratch resistance of this mirror, the layer system of LI and HI layers can be sealed with a heat-emitting or mechanically protective layer, for example, with a sol-gel layer, while the back of the mirror is provided with a likewise heat-emitting layer, for example, consisting of a 3 to 5 µm thick anodization layer of the aluminum substrate, as disclosed in EP 2 530 496 A1. However, for obtaining highest degrees of reflection, it is often impossible to dispense with a reflector layer made of a high-purity metal. For example, a solar reflection of more than 92% is only possible through the use of a reflector layer made of silver. In this regard, U.S. Pat. No. 5,019,458 claims solar mirrors having a solar reflection of 95.5% on a glass substrate, for which the reflector layer made of silver is embedded between a layer consisting of NiCr and ZnS. The reflection should not change over a period of a week at 95-100% relative humidity; 140° F. (60° C.), i.e. the designated operating temperatures are not unusually high.

Temperature-resistant highly reflective mirror systems having a total reflection greater than 95% are also required for applications other than in the solar field. Silver must also be used here as a reflector layer. Thus, LED chips having a greater number of LEDs are frequently mounted on a reflective substrate in order to increase the light yield— referred to as "MC-COB" (metal core—chip-on-board). Areas with film, in which conductor paths are integrated, or "PCBs" (printed circuit board), etc., which, for example, have recesses, are arranged on the substrate. Individual LEDs adhered directly to the surface reflector are respectively situated in the recesses.

The chip is encapsulated with a polymer, etc., which may have a "phosphor", i.e. a luminescent substance. The reflective substrate normally consists of a silver-coated copper sheet, a relatively expensive material. Its thermal resistance leaves much to be desired, which has great disadvantages because these LED chips can develop temperatures of around 150° C. and should have a lifetime of at least 20,000 hours. A layer system based on aluminum has also already been suggested—see e.g. DE 20 2011 050 976 U1, wherein the layer system should finish with an electrically insulating layer having a high electrical breakdown strength in order to enable good heat dissipation and simultaneously a high light yield. Therein, the degree of light reflection according to DIN 5036-3 is specified as "typically at 92.0%".

In the field of window glazing, where very thin metallic mirror layers comprised primarily of silver are often used, it is suggested to protect the metallic mirror layer from oxidation, agglomeration, and diffusion processes through additional protective layers placed above and below the mirror layer. However, the purpose of these layer systems is not to achieve a highest possible total reflection across the entire wavelength range of solar radiation (300-2700 nm), but rather to achieve a high transmission in the visible spectral range and conversely a high reflection in the infrared spectral range in order to achieve the best possible gain of energy through solar radiation with simultaneously minimal losses due to thermal radiation for buildings furnished with these window coated in this manner (so-called Low-E coating).

To be able to ensure the high transmission in the visible spectral range, the silver layers used must be very thin (<50 nm), i.e. they are by no means optically dense. Thus, they are particularly susceptible to corrosion, although they do not have to withstand high temperatures.

Thus, DE 33 07 661 A1 describes a layer sequence on a glass plate, wherein an indium oxide or tin oxide layer is applied under a silver layer having a thickness of 5 to 50 nm and therefore directly on the glass plate, and a metal selected among Al, Ti, Ta, Cr, Mn, and Zr is applied above the specified silver layer at a thickness of 2 nm, which is intended to inhibit the agglomeration of silver, and then another indium oxide or tin oxide layer follows. A similar layer sequence is disclosed in EP 0 104 870. EP 1 174 397 B1 suggests furnishing windshields for cars and the like with a low-emitting ("low-E") layer sequence, which has at least one IR-reflecting silver layer between respectively two layers consisting of nickel or a nickel alloy, which are respectively at least partially oxidized. The oxygen content of these layers increases in the direction pointing away from the silver layers. A first dielectric layer acting as an anti-reflector layer, e.g. composed of $TiO_x$, $SiO_x$ or $Si_xN_y$, etc., and a second dielectric layer acting as a dispersion-reducing layer, which may consist of $Si_3N_4$ or silicon mixed with aluminum and/or stainless steel, can be present between this layer structure and the glass substrate. WO 2012/036720 describes a structure on a glass substrate having at least one dielectric layer comprising boron-doped zinc oxide referred to as a "seed layer", an IR-reflector layer comprising silver and/or gold, and a dielectric layer above the IR-reflector layer. It may likewise consist of boron-doped zinc oxide: alternatively, it may consist of an oxide of nickel and/or chromium. The boron-doped zinc oxide layer is intended to improve the physical and chemical resistance of the coating without adversely affecting its electrical and optical properties. The silver layers for glass plates must be very thin so that the degree of transmission for visible light remains high. However, they do not have to withstand high temperatures.

Protective layers for metallic reflector layers are also suggested for other applications:

DE 10 2004 010 689 B3 discloses a solar absorber having a radiation-selective absorber coating, which has a diffusion barrier layer, a metallic reflector layer, a cermet layer, and an anti-reflector layer on a metal substrate. An oxide layer consisting of oxidized components of the metal substrate serves as the diffusion barrier layer. Suitable materials for the metallic reflector layer are not specified.

DE 10 2005 000 911 A1 discloses an "environmentally stable" mirror layer system having a high reflectivity ("significantly above 90%") in the visible spectral range to be deposited on "dielectric substrates" for use in optical devices, such as light integrator components or light tunnel components", which can be used in the light beam path of LCD or DLP projectors. In this case, the mirror layer comprising silver should be embedded between two ZnOx layers and then optimized in the reflection with a double LI-HI layer system consisting of SiO2 and TiO2.

U.S. Pat. No. 6,078,425 A reveals a silver-based mirror system for telescopes. Here, the mirror layer comprised of silver is embedded between two Ni—CrN layers and then furnished with an LI-HI layer system.

DE 930428 reveals a surface reflector on a metal substrate having an adhesive layer made of chromium and an overlying reflector layer made of Al, AlMg or Ag, which is embedded between two SiOx layers. The SiOx layer under the reflector layer is intended to act as a diffusion barrier and to prevent diffusion between the Cr and the reflector layer at high temperatures, thus decreasing the reflectivity.

U.S. Pat. Nos. 6,222,207 B1 and 6,593,160 B2 disclose the use of Ni, NiV or TiW:N as a diffusion barrier to prevent the migration of indium used as a soldering material into a silver reflector layer of a back surface reflector of a high-power LED chip when it is soldered to a system carrier, etc.

DETAILED DESCRIPTION OF THE INVENTION

The object of the present invention is to provide a temperature-resistant layer system having a very high, uniform reflection in the range of visible light and additionally in the range of solar radiation of 300 to 2700 nm. In the range of visible light, this layer system should have a total reflection of at least 94% and preferably at least 97%, and more preferably at least 98% according to DIN 5036 (ASTM E1651). For solar reflectors, this layer system should have a solar reflection of at least 89% and preferably of at least 92%, and more preferably of at least 95% according to ASTM 891-87. In specific embodiments, the proportion of diffuse reflection should be less than 11%, particularly preferably less than 7%, and more particularly preferably less than 3%, according to DIN 5036-3 (1° of aperture).

The layer system should be capable of being used as a reflector, e.g. for applications in LED chips (MC-COB), laser projectors, etc. (with a required long-term stability at temperatures of approx. 100 to approx. 150° C.), and preferably even for secondary solar mirror applications (with a required temperature resistance up to approx. 250° C., preferably even up to 300° C. or more).

This actual functional reflector layer comprising a reflector layer and a reflection-increasing LI/HI layer system should be protected from temperature-induced degradation mechanisms such as oxidation, diffusion, and agglomeration as well as corrosion.

This can be achieved by applying various additional layers both below and above the reflector layer.

High reflection is particularly important for LED COB applications since the light yield in case of a change of the total reflection improves or worsens by approx. a factor of 4 with respect to the reflection. In this application, a reflection as high as possible is particularly important in the wavelength range between 400 and 460 nm which are the usual emission wavelengths of the LEDs or laser diodes (depending on the embodiment). Moreover, the reflector should preferably be well protected against corrosion due to the fact that adhesive, polymer, and phosphor can have an increased corrosive effect on the mirror at the high operating temperatures.

The object is solved by providing the layer system on a standard substrate and by providing it with a reflector layer comprised of a metal, as is well-known in the state of the art, for example, composed of silver, aluminum, platinum, rhodium, molybdenum, tantalum, tungsten or an alloy using one or more of these metals, and making this reflector layer temperature-resistant through a specific layer sequence and protecting it preferably against corrosive and mechanical attacks.

Figure 1:
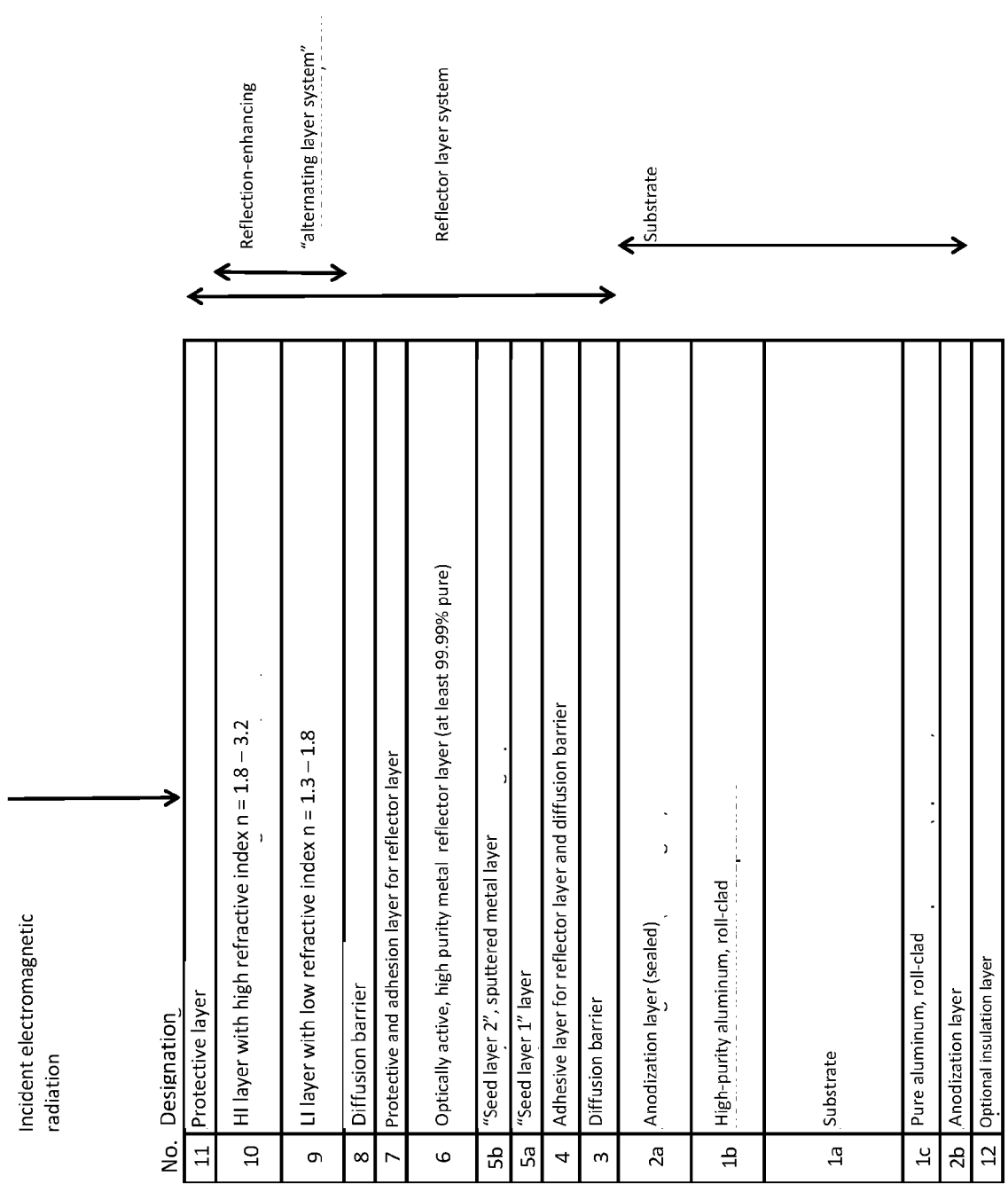
FIG. 1 is a diagram showing the components of a layer system according to the present disclosure.

Due to its properties, the layer system according to the invention can act as a surface reflector; it has the following components, which are explained in further detail below, for example with reference to FIG. 1:

an arbitrary metallic substrate (1) having a first surface side (A) and a second surface side (B), which is preferably composed of the following components:

1a) a core composed preferably of aluminum, an aluminum alloy, copper, molybdenum, titanium, tantalum, stainless steel, steel, iron, tinplate or an alloy using at least one of these materials or of at least two of these materials, more preferably composed of aluminum, for example, having a thickness of 0.1-2 mm and preferably of 0.3-1 mm, 1b/c) wherein said core can optionally be provided with a roll-cladding which preferably consists of high-purity aluminum (more preferably having a content of at least 99.5%, even more preferably of at least 99.8%, and particularly preferably of at least 99.9%), having a thickness of, for example, 0.02 to 0.5 mm, wherein the roll-cladding may be present on one side (layer 1b) on said first side (A) or on both sides, and 2a/2b) a layer composed of aluminum oxide on said optionally roll clad core, preferably manufactured through anodization ("anodization layer", "eloxal layer") of the aluminum surface in case the substrate has such a surface, which more preferably has been sealed through heat compacting, e.g. with hot water (pores become closed during the sealing process and the layer becomes less porous and therefore denser and more stable), having a thickness of, for example, 20 to 2000 nm and preferably 400 to 900 nm, wherein the aluminum oxide layer may be present on one side (layer 2a) on said first side (A) or on both sides (A) and (B), wherein, on said side (A), the following layers are additionally present above the substrate, or above layer 2a) in case a layer 2a) is present, and in the order indicated below from the inside to the outside:

4) a layer provided in particular for improving the adhesion to the metal of the reflector layer and as a diffusion barrier, consisting of a substoichiometric titanium oxide ($TiO_x$) or zirconium oxide ($ZrO_x$), wherein x is respectively <2, or a substoichiometric titanium oxynitride ($TiN_xO_y$, often referred to as TiON) or zirconium oxynitride ($ZrN_xO_y$), wherein respectively x≤1 and y<2 and x+y has such a value that the titanium atom or zirconium atom is formally not completely saturated, or a metal selected from among titanium, zirconium, molybdenum, platinum, and chromium or an alloy using one of these metals or at least two of these metals, preferably consisting of substoichiometric $TiN_xO_y$, having a thickness of preferably 5 to 50 nm and more preferably 10 to 30 nm, 5a) a layer ("seed" layer) which provides the condensation nuclei for a preferred growth of the reflector layer and thus ensures a good adhesion of the reflector layer and is provided in particular for preventing a subsequent agglomeration of the metal of the reflector layer and thus for improving the temperature stability, consisting of a nickel alloy, preferably having chromium, aluminum, vanadium, molybdenum, cobalt, iron, titanium and/or copper as an alloying partner, wherein nickel-vanadium is preferred, or consisting of a metal selected from among copper, aluminum, chromium, molybdenum, tungsten, tantalum, titanium, platinum, ruthenium, rhodium, and alloys using one of these metals or at least two of these metals, or of iron, steel or stainless steel, particularly preferably of a NiV alloy, Cu or stainless steel, preferably having a thickness of 2-40 nm and more preferably 5-30 nm, wherein aluminum should preferably be chosen if it is sputtered and used in combination with an aluminum reflector layer as will be explained in further detail below, 6) a reflector layer composed of a high-purity metal, preferably having a degree of purity of at least 99.9%, more preferably selected from among silver, aluminum, gold, platinum, rhodium, molybdenum, and chromium or an alloy using one of these metals or at least two of these metals, particularly preferably composed of silver or aluminum, even more preferably composed of silver, wherein the thickness is selected so that it is optically dense, i.e. no or essentially no (preferably less than 1%) electromagnetic radiation in the range of 300-2700 nm and particularly in the range of visible light is allowed to pass into underlying layers, preferably having a thickness of 50 to 200 nm or even up to 300 nm, frequently 90 to 300 nm, more preferably of 80 to 180 nm or of 100 to 200 nm, 7) a layer, which is particularly intended to counteract the agglomeration of the metal of the reflector layer and also to improve the adhesion of the layers arranged above the reflector layer. It is preferably selected from among a substoichiometric oxide of titanium, zirconium, hafnium, vanadium, tantalum, niobium or chromium or a mixed oxide of two or more of these metals, or from among metals selected from among chromium, titanium, zirconium, hafnium, vanadium, niobium, tantalum, tungsten, molybdenum, rhodium, and platinum, and alloys using one of these metals or at least two of these metals, and which is particularly preferably formed of substoichiometric chromium oxide or substoichiometric titanium oxide, preferably having a thickness of around 2 to 20 nm and more preferably around 2 to 10 nm, 9) a layer having a lower refractive index (LI layer) in relation to the directly adjoining layer 10) ("HI layer"), frequently having a refractive index n=1.3 to 1.8, selected from among materials well-known to persons skilled in the art for this purpose, such as metal oxides, metal fluorides, metal nitrides, metal oxynitrides, and metal carbooxynitrides, e.g. $SiO_x$, $Al_2O_3$, $MgF_2$, $AlF_3$, $CeF_3$, $YF_3$, $BaF_2LaF_3$, $SiAlO_x$ (SiLa), $TiAlO_x$, and borosilicate glass, wherein index x can be selected in the oxides such that either a stoichiometric compound is present or the cations of the oxides are formally not completely saturated (i.e. a substoichiometric compound is present), particularly composed of $SiO_x$ or $Al_2O_3$ having a thickness of usually 10 to 200 nm, preferably 40 to 100 nm, and 10) a layer (HI layer) directly adjoining layer 9) having a higher refractive index in relation to layer 9) ("LI layer"), frequently having a refractive index of n=1.8 to 3.2, selected from among materials known to persons skilled in the art for this purpose, such as metal oxides, fluorides, nitrides, oxynitrides, and carbon oxynitrides, e.g. $TiO_x$, $TiAlO_x$, $ZrO_x$, $HfO_x$, $La_2O_3$, $Y_2O_3$, $Bi_2O_3$, ZnO, $SnO_2$, $Nb_2O_5$, $Y_2O_3$, $Si_3N_4$, wherein index x can be selected such that either a stoichiometric compound is present or the cations of the oxides are formally not completely saturated, particularly composed of $TiO_x$ or $ZrO_x$ having a thickness of normally 10 to 200 nm, preferably 40 to 100.

The layer system optionally contains additional layers. Thus, one or more of the following layers may additionally be present:

3) an additional layer between layer 2a) and layer 4) which is particularly provided as a diffusion barrier against the passage of metal atoms of the substrate as well as of atoms of the reflector layer, preferably selected from among nitrides and oxynitrides, in particular of chromium, titanium, titanium-aluminum, and aluminum, as well as ZAO (zinc aluminum oxide), which particularly preferably consists of CrN and preferably has a thickness of 5 to 50 nm, 5b) directly under the reflection layer 6), a layer, which preferably is not optically dense, which particularly preferably grows on the condensation nuclei provided by layer 5a) and is intended to support a particularly dense growth of the metal for the reflector layer ("seed layer 2") and preferably consists of the same metal as the reflector layer, wherein this layer is applied by means of a PVD process, particularly through sputtering, and is particularly beneficial for depositing metal for the reflection layer through a process other than sputtering, for example, through electron beam evaporation, preferably having a thickness of 2 to 100, more preferably of 2 to 90 nm, and even more preferably of 5 to 40 nm, 8) a layer between layer 7) and layer 9) which is particularly intended to prevent the outward diffusion of atoms of the reflection layer and a diffusion of oxygen into the reflector layer and to improve the corrosion resistance of the layer system, preferably composed of a material that is selected from among stoichiometric and substoichiometric $ZnAlO_x$ (ZAO), ZnO, $TiO_x$, $TiAl_nO_xN_y$, $TiO_xN_y$, $ZrO_x$, $ZrAl_nO_xN_y$, $ZrO_xN_y$, $Si_3N_4$, $Al_2O_3$, and $AlO_xN_y$, particularly preferably of $TiO_x$, ZAO or $Al_2O_3$, wherein the index x and the sum x+y have such a value that either a stoichiometric compound is present or the metallic cation(s) is/are formally not completely saturated (i.e. a substoichiometric compound is present) and n can assume a value of >1 to 2 or more, having a thickness of preferably 2 to 30 nm and more preferably of 10 to 20 nm, wherein the stoichiometric compounds are preferred over substoichiometric compounds, and 11) a protective finish layer, in particular composed of a fluoride, oxide, oxynitride or oxycarbonitride, preferably of $LaF_3$, $ZrO_x$, $SiO_x$, $SiO_xN_yC_z$, $SnO_2$, $In_2O_3$, $SnInO_x$, $InZnO_x$ (ITO), $ZnAlO_x$ (ZAO) or DLC (DLC refers to "diamond like carbon" layers having a high proportion of $sp^3$ bonds), wherein the index x as well as sum x+y+z have such a value that either a stoichiometric compound is present or the metallic cation(s) is/are formally not completely saturated (i.e. a substoichiometric compound is present). This layer can also be formed to serve as an adhesion promoting layer for an adhesive system with which components, such as LED diodes or a PCB, are adhered on the reflector layer. In the case of solar mirrors, this layer can also be formed to serve as an adhesion promoting layer for an additional sol-gel coating or varnish coating. The protective layer 11) may also be a varnish (particularly preferably a fluoropolymer) or a sol-gel layer (having a three-dimensional oxidic, in particular, a siliceous network). This is particularly beneficial if the surface mirror is intended to be used as a solar reflector or as an MC-COB, wherein the LEDs are to be mounted in FLIP-CHIP technology.

In case of using the surface mirror for example as MC-COB for LEDs, an electrically insulating layer 12) such as a varnish or an adhered insulating film is preferably applied on the back side (on side B) of the surface mirror. The application of an electrically insulating varnish is preferred. In this regard, the dielectric strength should preferably be 2000 V and particularly preferably 4000 V.

The layer system according to the present invention can be applied to metallic substrates by means of industrial thin-film coating processes, e.g. PVD, CVD, or PECVD. This may be done in a particularly cost-effective manner if the substrate is available as a sheet so that it can be both pre-treated and then coated with a layer system in a so-called vacuum coil coating device which is particularly preferably designed as an "air-to-air" system in order to be able to successively coat multiple sheets without interrupting production.

Layers 3), 4), 5a), 5b), 7), and 8) are preferably applied by means of a PVD process such as sputtering. The reflection layer 6) and the alternating layer system of layers 9) and 10) can be applied by means of sputtering as well; however, it is preferred that they are deposited via electron beam evaporation. Protective layer 11) can be a sol-gel layer (having a three-dimensional oxidic, in particular, a siliceous network) or any applied varnish, however, it can instead also be applied by means of any other process such as a PVD process like sputtering or through CVD or PECVD (plasma-enhanced chemical vapor deposition).

Layers 4), 5a), 6), 7), 9), and 10), optionally in combination with layers 3) and/or 5) and/or 8) and/or 11), should be regarded as an optically-active layer system. Therein, layers 9) and 10) act in a familiar manner as a reflection-enhancing "alternating layer system". Both of these layers can be used repeatedly as well, wherein an HI layer always follows an LI layer. Preferably, the reflection-enhancing alternating layer system is so designed and optimized that—depending on the application—the reflection is particularly high in the case of LEDs or lasers at their emission wavelengths, or a particularly high solar reflection is achieved in the case of solar mirrors. This can be achieved with the help of optical calculations known to persons skilled in the art.

The layers beneath the reflection layer may be selected with the consideration that they do not have to be highly transparent. The layers above the reflector layer are different—they should preferably be highly transparent. Considering this, it is preferable to select an oxidic layer for layer 7) which is more preferably substoichiometric since, in addition to good transparency, a substoichiometric layer ensures a good adhesion to the overlying layers.

Figure 2:
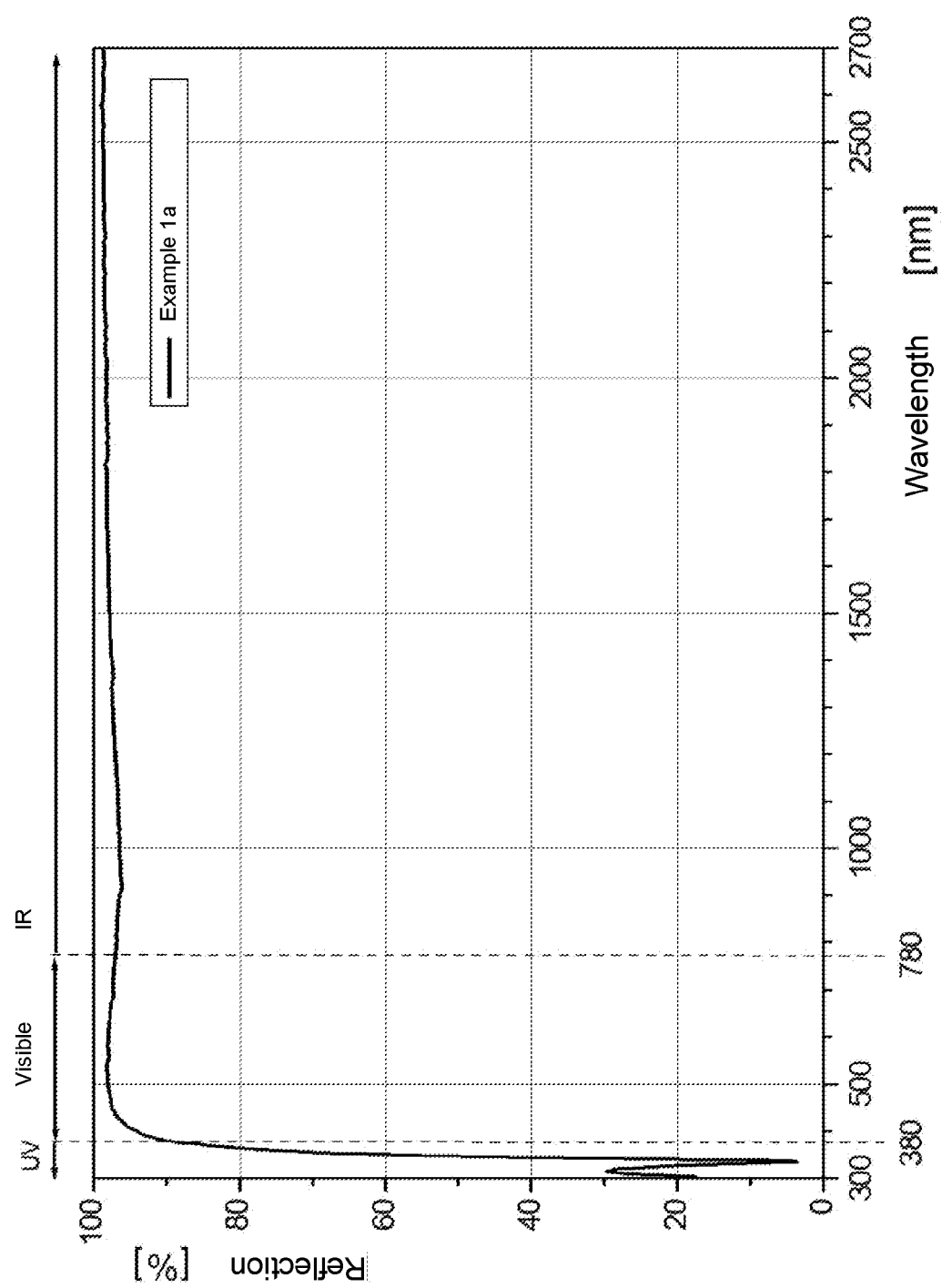
FIG. 2 is a graph showing a relationship between reflection (%) and wavelengths for a layer system according to the present disclosure.

A layer system composed of layers 4), 5a), 5b), 6), 7), 9), and 10) which respectively consisted of the materials described as preferred materials, as well as a layer system that additionally had layers 3) and 8), showed a total reflection of 98%, wherein the reflection proceeded almost unchanged and completely continuous with increasing wavelengths for wavelengths starting at 470 nm and higher (see FIG. 2).

The temperature resistance is improved through the combination of layers 4) and 5a), preferably in combination with layer 5b) since atoms from the substrate, such as residual chemicals from the anodization process, cannot pass through the diffusion barrier of layers 4) and potentially 3) when anodized aluminum is used as a substrate. Such a migration would result in a contamination of the high-purity metallic reflector layer which would be associated with a rapid deterioration of the reflective properties. By the layer combination according to the invention, a diffusion of metal atoms from the reflector layer into the substrate which would cause the reflector layer to no longer be optically dense is furthermore prevented. The latter would likewise be associated with a rapid deterioration of the reflective properties.

According to a preferred embodiment of the surface reflector according to the invention, the layer sequence which begins with layer 4) or 3) is applied to a roll-clad aluminum substrate, wherein the roll-cladding consists of high-purity aluminum having an aluminum content of at least 99.5% or more preferably of at least 99.8% or even 99.9%, which has been electrochemically polished, subsequently anodized, and sealed by means of heat compacting in a water bath.

This substrate is advantageous in that the mechanical properties are determined by the alloy of the aluminum core although the surface consists nevertheless of aluminum having minimal impurities. Thus, e.g. in the case of solar mirrors, it is important that the mirror is very rigid so that the focus of the mirror does not change significantly even with wind load. A particularly rigid substrate is also required, for example, with LED chips in order to be able to bond these to a cooling element as tightly as possible. In contrast, high-purity aluminum is very soft and mostly does not meet the required mechanical properties.

On the other hand, high-purity aluminum offers the advantage that no pitting corrosion occurs at impurity sites during electrochemical polishing, resulting in an extremely smooth surface with a minimal proportion of diffuse reflection which is important for the intended application purposes.

In a preferred embodiment, the surface of this sheet substrate is treated in a continuous wet-chemical process, wherein the substrate passes through various baths: first, the sheet substrate passes through a cleaning bath in which surface impurities from the rolling process are removed. Then, the strip passes through a bath in which it is electrochemically polished. Next, it passes through a bath in which an aluminum oxide layer is formed on the surface through anodic oxidation. In a subsequent water bath, the pores of the aluminum oxide layer are closed through heat compacting resulting in the formation of a smooth, rigid surface which can be coated by means of a vacuum process. These layers are referred to as ELOXAL layers or ANOXIC layers.

The layer system according to the invention is preferably applied in a continuous vacuum coil (sheet) coating process (air-to-air process).

It is particularly preferred to pre-treat the substrate by means of a plasma purification step prior to applying the first layer 4) or 3) in order to remove the water film which forms on every technical surface exposed to air and other impurities on the substrate surface. It is particularly preferred to carry this out by a so-called glow discharge using argon, an argon/hydrogen mixture or an argon/oxygen mixture. This ensures that layer 4) can firmly to the substrate surface to achieve a sufficient adhesion of the layer system.

PVD, CVD, as well as PECVD processes can be used to deposit the layer system. Deposition processes such as sputtering, thermal evaporation or electron beam evaporation (both reactive as well as non-reactive) are particularly preferably applied.

Layer 3) is preferably reactively sputtered in order to obtain a good adhesion to the substrate and to obtain a layer that is as dense as possible which thereby is particularly suitable as a diffusion barrier.

It is particularly preferred to apply the adhesion and barrier layer 4) on the substrate by means of sputtering. In the case of $TiO_x$ or $TiO_xN_y$, the layer is applied by means of reactive sputtering by addition of oxygen or nitrogen. Preferably, a titanium target is used, and particularly preferably a $TiO_x$ target.

Temperature tests showed that $TiO_x$ forms a preferred diffusion barrier and $TiO_xN_y$ forms a particularly effective and thus preferred diffusion barrier on an anodized aluminum substrate.

Metallic layers are particularly preferred for substrates having a metallic surface.

For layer 5a) (seed layer 1), a material is preferably selected for which, in the electrochemical series, the difference with respect to the standard electrode potential of the material from which the reflector layer is formed, is as small as possible. This is important for an effective corrosion resistance of the surface mirror. In view of this, if the reflector layer consists for example of aluminum, primarily titanium, chromium or nickel or a nickel alloy are considered for layer 5a). If the reflector layer consists of chromium, e.g. aluminum, titanium or molybdenum can be selected, and if it consists of copper, for example iron, molybdenum or silver can be selected. For a reflector layer composed of molybdenum, there can be selected nickel or a nickel alloy, chromium or iron as a material for layer 5a). If it consists of silver, mainly copper, NiV or platinum would be used for layer 5a). In addition, it is beneficial if the material is selected to be able to form an alloy with the material of the reflector layer so that the atoms of both layers can diffuse in the interface between layer 5a) and reflector layer 6). This is important to ensure an effective layer adhesion and to later prevent an agglomeration of the reflector layer when exposed to temperature.

The use of a nickel alloy is particularly preferred as these alloys have a good oxidation resistance when exposed to temperature and an excellent corrosion resistance. It is particularly preferred to use those Ni alloys that are non-ferromagnetic in order to achieve a high rate of deposition during magnetron sputtering. Pure nickel is ferromagnetic and disrupts the magnetic fields of the magnetron-sputtering units and, hence, only very low sputtering rates can be achieved and the sputtering process becomes economically inefficient. Through targeted alloying, the ferromagnetism of the nickel can be suppressed. For example, the following nickel alloys are non-ferromagnetic and are therefore preferably suitable for magnetron sputtering: NiCr 80:20%, NiV 93:7%, and NiAl 90:10% (in percentages by weight, respectively). NiV is particularly preferably used.

Temperature tests showed that NiV also excellently prevents the migration of silver since NiV is a good diffusion barrier and silver adhers very well to NiV due to the fact that nickel readily forms alloys with silver. The corrosion resistance is also excellent.

A thin copper layer (4-10 nm) is also preferably suitable as a seed layer for a reflector layer 6) composed of silver since copper readily forms alloys with silver and the difference to the standard electrode potential of silver is particularly low. Thick copper layers >10 nm are not suitable as the copper diffuses into the silver under the influence of temperature and, thus, decreases the reflection of the silver layer.

Preferably, a high-purity aluminum layer and particularly preferably a high-purity silver layer is used as a reflector layer 6) since these materials already have a particularly high intrinsic reflection in the relevant wavelength range (aluminum TR=90%; silver TR=95%).

These materials are preferably deposited by means of electron beam evaporation because this process ensures high deposition rates, making the process particularly economically efficient, and on the other hand, the material can be deposited with a significantly lower pressure as compared to sputtering (1E-6 to 1E-4 mbar, while the pressure for sputtering is at 1E-3 bis 6E-3 mbar) resulting in that the layer becomes contaminated by significantly lower amounts of residual gas.

However, vapor-deposited layers have a disadvantage in that the particles impinge upon the substrate with only minimal kinetic energies (smaller than 10 eV) so that these layers mostly do not adhere well. To compensate for this disadvantage, it is particularly preferred to sputter a "seed layer 2" (layer 5b) composed of a metal, preferably the same metal of which the reflector layer 6) consists, on layer 5a). During sputtering, the particles have a substantially higher kinetic energy (50-500 eV) and, hence, adhere considerably better on the condensation nuclei provided by "seed layer 1" (layer 5a). The vapor-deposited material then grows much better on this sputtered layer.

In a specific case in which reflector layer 6) consists of aluminum, sputtered aluminum may be used as "seed layer 1". The vapor-deposited aluminum reflector layer 6) adheres particularly well thereon, such that a second "seed layer" can be omitted.

On the other hand, if it is intended to deposit the reflector layer 6) completely by means of sputtering, layer 5b) can be omitted.

Layer 7) is also deposited preferably by means of sputtering since the thickness of this layer has to be met very precisely in order to avoid significantly reducing the high reflection of the reflector layer. This requirement can be satisfied particularly well by sputtering because the deposition rate in this case can be precisely regulated via the applied electrical power.

If a metallic material is to be used for layer 7), the precise control of the layer thickness is particularly important since only a few nm suffice to significantly reduce the reflection of the reflector layer. Therefore, the use of a substoichiometric oxide or mixed oxide is preferred among the aforementioned materials. The advantage is that the metals become partially transparent due to the oxidation, resulting in that the reflection of the reflector layer is reduced less even in case of greater layer thicknesses. In contrast, the use of stoichiometric oxides would affect the functionality of layer 7 as an adhesive layer because all metallic compounds would be saturated, and hence, the layer would adhere poorly to the reflector layer and thus impair the functions of preventing agglomeration and of promoting adherence to the overlying layers.

For depositing these substoichiometric layers, a reactive sputtering technology while monitoring the oxygen content in the sputtering chamber is preferably applied. To be able to precisely control the degree of oxidation, it is particularly preferred to use a plasma monitor or a lambda sensor for controlling the oxygen flow, to be able to precisely adjust the oxygen content of the layer can be precisely adjusted. In addition, the precise metering of the reactively supplied oxygen is important because an oxidation of the underlying metallic reflector layers may occur in case of an excess supply, which could result in a reduction of the reflection thereof.

Layer 8) serves as a diffusion barrier. In contrast to the diffusion barrier layers which are located below the reflector layer, this layer has to be highly transparent. Thus, dielectric materials are preferably used. These have to be deposited sufficiently dense in order to be able to fulfill their function as a diffusion barrier. Therefore, these layers are preferably deposited reactively by means of medium-frequency sputtering or reactive pulsed direct current sputtering. These processes are particularly suited for depositing dense dielectric materials. It is particularly preferred to use ceramic targets.

Since layers 9) and 10) have to be relatively thick in order to be able to fulfill their optical function as a reflection-enhancing layer structure, they are preferably deposited by means of electron beam evaporation, as this process ensures a high rate of deposition and thus a cost-efficient deposition.

Depending on the used materials, however, it may be advantageous to deposit both layers 9) and 10) by means of another method. If applicable, different methods can also be combined for depositing layers 9) and 10). For example, the combination of a layer 9) applied by means of electron beam evaporation (e.g. a $SiO_x$ layer because $SiO_x$ is difficult to sputter) with a sputtered layer 10) may be advantageous.

Layer 11) is preferably sputtered in order to obtain a good adhesion to layer 10) and a layer as dense as possible, which thereby functions particularly well as a diffusion barrier. If this layer should furthermore protect against abrasion, sputtering is also preferred because particularly hard layers can be produced with this method. However, protective layer 11) may also be a varnish (particularly preferably a fluoropolymer) or a sol-gel layer (with a three-dimensional oxidic network, particularly a siliceous network).

The invention will be explained in further detail below based on specific examples.

EXAMPLE 1

Surface Mirror for MB-COB for LEDs on an Aluminum Substrate

Roll-clad aluminum with an aluminum alloy core having a hardness of H18 or H19 and a roll-cladding on one side with 99.9% pure aluminum is used as a substrate. The thickness of the cladding is approx. 10% of the thickness of the core. Preferably, an aluminum sheet having a is thickness of between 0.7 and 1.0 mm, particularly preferably 0.7 mm, is used. The width may be up to 1600 mm, and a width of 1250 mm is particularly preferred.

The surface of this sheet substrate is treated in a continuous wet-chemical process, wherein the substrate passes through various baths: first, the sheet substrate passes through a cleaning bath in which surface impurities from the rolling process are removed. Then, the sheet passes through a bath in which it is electrochemically polished. Next, it passes through a bath in which an aluminum oxide layer (layer 2) is formed on the surface by anodic oxidation. In a subsequent water bath, the pores of the aluminum oxide layer are closed through heat compacting, whereby a smooth, stable surface is formed which can be coated by means of a vacuum process First Variation of Layer 2)

In a preferred embodiment, an aluminum oxide layer 2) having a thickness between 400 and 900 nm is applied. Compared to the thickness of between 1000 and 2000 nm normally used for lighting applications, this thickness offers the benefit that the surface of the surface reflector adequately protects against mechanical damage and also contains a low residual quantity of chemicals and water from the wet-chemical process and, hence, pressure problems during the subsequent coating by means of a vacuum process do not arise, and later on, fewer impurities can diffuse from the aluminum oxide layer into the overlying layer system under the influence of temperature.

Second Variation 1b of Layer 2)

In another preferred embodiment, an aluminum oxide layer 2) having a thickness of only 20-80 nm is applied. This layer thickness is still sufficient to ensure a good protection of the aluminum surface and a good coatability by means of vacuum processes. While this embodiment does not offer a too high protection against mechanical damage, it offers the benefit that the aluminum oxide layer, due to the smaller volume, contains an even smaller residual amount of chemicals and water which could diffuse into the overlying layer system under the influence of temperature and thus could decrease the reflectivity of the layer system. TEM studies also demonstrated that even with very good diffusion barrier layers, which are arranged between the substrate and the reflector layer, a diffusion of the atoms of the reflector layer into the aluminum oxide layer can occur after prolonged exposure (more than 10000 hours) to high temperatures (>80° C.). It was observed that the pores of the anodization layer become filled with atoms from the reflector layer over time. When eventually all pores are filled, this process comes to a halt. In case the reflector layer is initially at least twice as thick as the anodization layer, it was observed that the thickness of the remaining reflector layer is sufficient to be optically dense and therefore has no significant loss of reflection.

Then, the substrate pre-treated in this manner is coated by means of an air-to-air PVD sheet coating system (coil coating system).

After the sheet has entered the vacuum through vacuum locks, the substrate surface is cleaned by means of a plasma process. Then, the sheet passes through various coating stations in which the individual layers of the layer system are deposited by means of various aforementioned PVD processes. The layer thicknesses of the individual layers are measured and regulated through ellipsometry in these processes. The optical properties of the entire layer system at the end of the coating process are measured by spectrometers.

Specifically, the following layer system is deposited in the following sequence.

Coating Station 1

Layer 4) consists of $TiN_xO_y$ and is deposited by means of reactive magnetron sputtering with a layer thickness of 3-50 nm.

Coating Station 2

Layer 5a) (seed layer 1) consists of NiV 93:7 percent by weight and is deposited by means of magnetron sputtering with a layer thickness of 2 to 40 nm.

Coating Station 3

Layer 5b) (seed layer 2) consists of silver and is deposited by means of magnetron sputtering with a layer thickness of 2-20 nm.

Coating Station 4

Layer 6) consists of high-purity silver (99.99%) and is deposited by means of electron beam evaporation. The layer thickness is between 80 and 180 nm.

Coating Station 5

Layer 7) consists of substoichiometric $CrO_x$ or TiOx and is deposited by means of sputtering. The layer thickness is between 2-10 nm Coating Station 6

Layer 9) consists of SiOx and is deposited by means of electron beam evaporation. The layer thickness is 60 nm.

Coating Station 7

Layer 10) consists of $TiO_x$ and is deposited by means of electron beam evaporation. The layer thickness is 50 nm.

Further Variations

In a specific variation, which can be combined with all other embodiments of the invention, a diffusion barrier layer (8) composed of $Al_2O_3$ or $TiO_x$ is arranged between layer (7) and (9). Thereby, the temperature resistance of the layer system can be further increased. This variation is particularly suitable in combination with the first variation of layer 2).

Specific layer systems of Example 1 are listed in the following tables, wherein particularly favorable thickness ranges are specified in some instances:

| No. | Example 1a | Material | Layer thickness |
|---|---|---|---|
| 11 | Protective layer | | 0 |
| 10 | HI layer with high refractive index n = 1.8-3.2 | TiOx | 50 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOxNy | 10-30 nm |
| 3 | Diffusion barrier | | |

| No. | Example 1a | Material | Layer thickness |
|---|---|---|---|
| 2a | Anodization layer (sealed) | Al2O3 | 400-900 nm |
| 1b | High-purity aluminum, roll-clad | Al 99.9% | 0.05-0.3 mm |
| 1a | Substrate | Aluminum alloy | 0.7-1.0 mm |
| 1c | Pure aluminum, roll-clad (optional) | | |
| 2b | Anodization layer | Al2O3 | 400-900 nm |
| 12 | Optional insulation layer | | |

Figure 3:
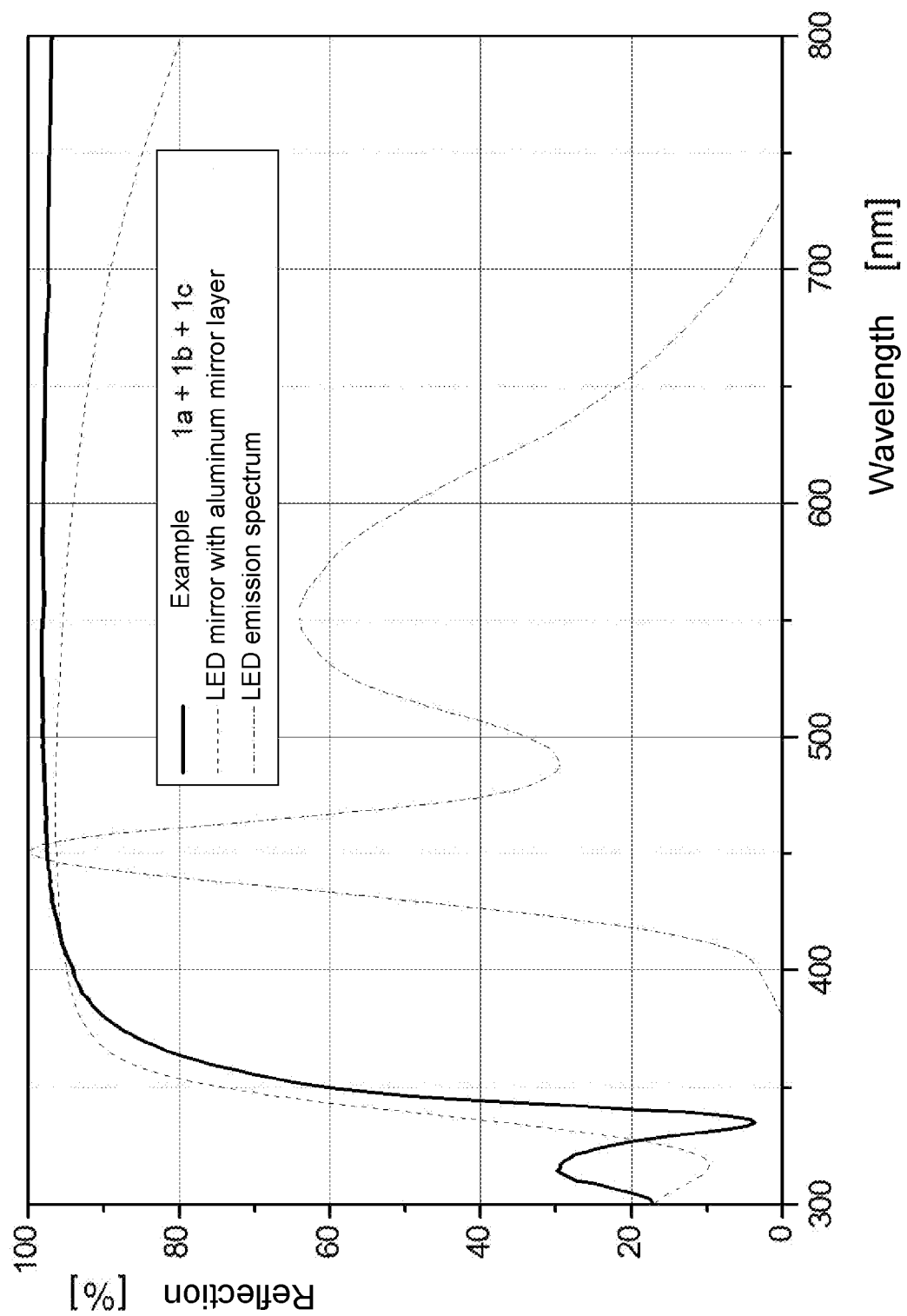
FIG. 3 is a graph showing an LED emission spectrum and showing relationships between reflection (%) and wavelengths for layer systems according to the present disclosure and for an LED mirror with an aluminum mirror layer.

This layer system has a total reflection greater than 98% (see FIG. 3). Temperature resistance is very good. At a temperature of 150° C. for more than 3000 hours, the decrease of the total reflection is maximally 2%.

The corrosion resistance of this layer system is also very good. In a 10% $K_2S$ solution, the reflection decreased less than 2% after 48 hours, while a layer system without a NiV layer was already completely destroyed after 1 hour. Even in 10% sulfuric acid, the reflection decreased less than 2% over a period of 100 hours, while a layer system without a NiV layer showed a decrease of reflection of more than 2% already after 24 hours.

In a climate test at 85° C., 85% relative humidity, for more than 1000 hours, the total reflection decreased less than 1%, while the total reflection decreased more than 4% in the case of a standard product for lighting.

EXAMPLE 1a'

As an alternative to Example 1a, ZrOx can be used for layer 10 instead of TiOx. Thereby, a further improvement of corrosion resistance is achieved. Also in this case the total reflection has a value of greater than 98%.

| No. | Example 1a' | Material | Layer thickness |
|---|---|---|---|
| 11 | Protective layer | | 0 |
| 10 | HI layer with high refractive index n = 1.8-3.2 | ZrOx | 58 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOxNy | 10-30 nm |
| 3 | Diffusion barrier | | |
| 2a | Anodization layer (sealed) | Al2O3 | 400-900 nm |
| 1b | High-purity aluminum, roll-clad | Al 99.9% | 0.05-0.3 mm |
| 1a | Substrate | Aluminum alloy | 0.7-1.0 mm |
| 1c | Pure aluminum, roll-clad (optional) | | |
| 2b | Anodization layer | Al2O3 | 400-900 nm |
| 12 | Optional insulation layer | | |

EXAMPLE 1b

The layer system of alternative Example 1b is listed in the following table. This example uses $Al_2O_3$ as an additional diffusion barrier (layer 8):

| No. | Example 1b | Material | Layer thickness |
|---|---|---|---|
| 11 | Protective layer | | 0 |
| 10 | HI layer with high refractive index n = 1.8-3.2 | TiOx | 50 nm |
| 9 | LI layer with low refractive index n = 1.3-1.8 | SiOx | 40-55 nm |
| 8 | Diffusion barrier | Al2O3 | 5-25 nm |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOxNy | 10-30 nm |
| 3 | Diffusion barrier | | |
| 2a | Anodization layer (sealed) | Al2O3 | 400-900 nm |
| 1b | High-purity aluminum, roll-clad | Al 99.9% | 0.05-0.3 mm |
| 1a | Substrate | Aluminum alloy | 0.7-1.0 mm |
| 1c | Pure aluminum, roll-clad (optional) | | |

| No. | Example 1b | Material | Layer thickness |
|---|---|---|---|
| 2b | Anodization layer | Al2O3 | 400-900 nm |
| 12 | Optional insulation layer | | |

EXAMPLE 1b'

The layer system of an alternative example to Example 1b is listed in the following table. This example uses TiOx as a diffusion barrier (layer 8):

| No. | Example 1b | Material | Layer thickness |
|---|---|---|---|
| 11 | Protective layer | | 0 |
| 10 | HI layer with high refractive index n = 1.8-3.2 | TiOx | 50 nm |
| 9 | LI layer with low refractive index n = 1.3-1.8 | SiOx | 40-55 nm |
| 8 | Diffusion barrier | TiOx | 5-25 nm |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOxNy | 10-30 nm |
| 3 | Diffusion barrier | | |
| 2a | Anodization layer (sealed) | Al2O3 | 400-900 nm |
| 1b | High-purity aluminum, roll-clad | Al 99.9% | 0.05-0.3 mm |
| 1a | Substrate | Aluminum alloy | 0.7-1.0 mm |
| 1c | Pure aluminum, roll-clad (optional) | | |
| 2b | Anodization layer | Al2O3 | 400-900 nm |
| 12 | Optional insulation layer | | |

Layer system 1b or 1b' has a total reflection of greater than 98% (see FIG. 3). The temperature stability is also very good. In case of storage at a temperature of 150° C. for more than 3000 hours, the decrease of the total reflection is maximally 2%.

EXAMPLE 1c

The layer system of another Example 1c is listed in the following table. In this case, only a thin anodization layer ("flash anodized") of 40-80 nm was applied:

| No. | Example 1c | Material | Layer thickness |
|---|---|---|---|
| 11 | Protective layer | | 0 |
| 10 | HI layer with high refractive index n = 1.8-3.2 | TiOx | 50 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOx or TiOxNy | 10-30 nm |
| 3 | Diffusion barrier | | |
| 2a | Anodization layer (sealed) | Al2O3 | 40-80 nm |
| 1b | High-purity aluminum, roll-clad | Al 99.9% | 0.05-0.3 mm |
| 1a | Substrate | Aluminum alloy | 0.7-1.0 mm |
| 1c | Pure aluminum, roll-clad (optional) | | |
| 2b | Anodization layer | Al2O3 | 40-70 nm |
| 12 | Optional insulation layer | | |

An improved temperature stability was observed in Example 1c (in case of storage at a temperature of 150° C. for more than 3000 hours, the maximum decrease of the total reflection was 1%) than in Example 1a, although a slightly lower corrosion resistance was observed. This layer system has a total reflection greater than 98% as well (see FIG. 3):

EXAMPLE 1d

As an alternative, the reflector layer can also be embedded between a stainless steel layer and a TiO$_x$ layer. The layer system of Example 1d is listed in the following table:

| No. | Example 1d | Material | Layer thickness |
|---|---|---|---|
| 11 | Protective layer | | 0 |
| 10 | HI layer with high refractive index n = 1.8-3.2 | TiOx | 50 nm |
| 9 | LI layer with low refractive index n = 1.3-1.8 | SiOx | 60 nm |
| 8 | Diffusion barrier | | 0 |
| 7 | Agglomeration protection layer | TiOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | stainless steel | 2-40 nm |
| 4 | Adhesive layer for silver and diffusion barrier | TiOx or TiOxNy | 10-30 nm |
| 3 | Diffusion barrier | | |
| 2a | Anodization layer (sealed) | Al2O3 | 400-900 nm |
| 1b | High-purity aluminum, roll-clad | Al 99.9% | 0.05-0.3 mm |
| 1a | Substrate | Aluminum alloy | 0.7-1.0 mm |
| 1c | Pure aluminum, roll-clad (optional) | | |
| 2b | Anodization layer | Al2O3 | 400-900 nm |
| 12 | Optional insulation layer | | |

This layer system has a total reflection greater than 98%.

EXAMPLE 1e

To further improve the adhesion of the adhesive system for LEDs on the surface and to reduce the corrosive attack of adhesive components on the layer system, sputtering an additional cover layer 11 on the layer system proved to be beneficial.

In this regard, it is particularly preferred to use SiOx, ZrOx or ZAO, and SiOx is especially preferred.

The layer system of Example 1e is listed in the following table:

| No. | Example 1e | Material | Layer thickness |
|---|---|---|---|
| 11 | Protective layer | SiOx | 5-10 nm |
| 10 | HI layer with high refractive index n = 1.8-3.2 | TiOx | 45 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOx or TiOxNy | 10-30 nm |
| 3 | Diffusion barrier | | |
| 2a | Anodization layer (sealed) | Al2O3 | 400-900 nm |
| 1b | High-purity aluminum, roll-clad | Al 99.9% | 0.05-0.3 mm |
| 1a | Substrate | Aluminum alloy | 0.7-1.0 mm |
| 1c | Pure aluminum, roll-clad (optional) | | |
| 2b | Anodization layer | Al2O3 | 400-900 nm |
| 12 | Optional insulation layer | | |

EXAMPLE 2

Surface Mirror for MB-COB on a Copper Substrate

For LED chips having a very high output, a substrate having a very high thermal conductivity is required in order to be able to effectively dissipate the developing heat. In this case, it is beneficial to deposit the layer system on copper. To this end, e.g. copper DHP or DLP having a thermal conductivity of more than 340 W/mK or preferably OF copper having a particularly high thermal conductivity (>390 W/mK), and particularly preferably OF copper alloyed with silver (0.03%), which has better heat resistance, can be used.

The copper in strip/sheet form is likewise coated by means of a PVD sheet (coil) coating system. Because copper surfaces may still have slight oil residues on the surface from the rolling process, it is necessary in this case that they are not only glowed, but also plasma etched. Like in case of an aluminum substrate, the sheet passes through various coating stations during coating; however, in this case, layer 4) consists of a metallic layer. It is particularly preferred to use chromium. Thus, the following is a particularly preferred layer system for copper substrates:

| No. | Example 2 | Material | Layer thickness |
|---|---|---|---|
| 11 | Protective layer | | 0 |
| 10 | HI layer with high refractive index n = 1.8-3.2 | TiOx | 50 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | Cr | 10-30 nm |
| 3 | Diffusion barrier | | |
| 2a | Anodization layer (sealed) | | |
| 1b | High-purity aluminum, roll-clad | | |
| 1a | Substrate | OF copper 0.03% Ag | 0.2-0.4 mm |
| 1c | Pure aluminum, roll-clad (optional) | | |
| 2b | Anodization layer | | |
| 12 | Optional insulation layer | | |

This layer system has a total reflection greater than 97%.

EXAMPLE 3a

Solar Reflector with Sputtered Protective Layer

For surface mirrors used as solar reflectors, it is important that the portion of directed reflection is particularly high in order to be able to focus the solar radiation as well as possible, i.e. the proportion of diffuse reflection should be as small as possible. In this case, a roll clad aluminum having a particularly smooth surface is preferably used (Ra<0.1 µm).

The layer system further has a protective layer 11 which, especially preferred, is composed of reactively sputtered ZrOx in order to protect the system against abrasion and corrosion.

The layer system of Example 3a is listed in the following table:

| No. | Example 3a | Material | Layer thickness |
|---|---|---|---|
| 11 | Protective layer | ZrOx | 5-20 nm |
| 10 | HI layer with high refractive index n = 1.8-3.2 | TiOx | 30-45 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOx or TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

Figure 4:
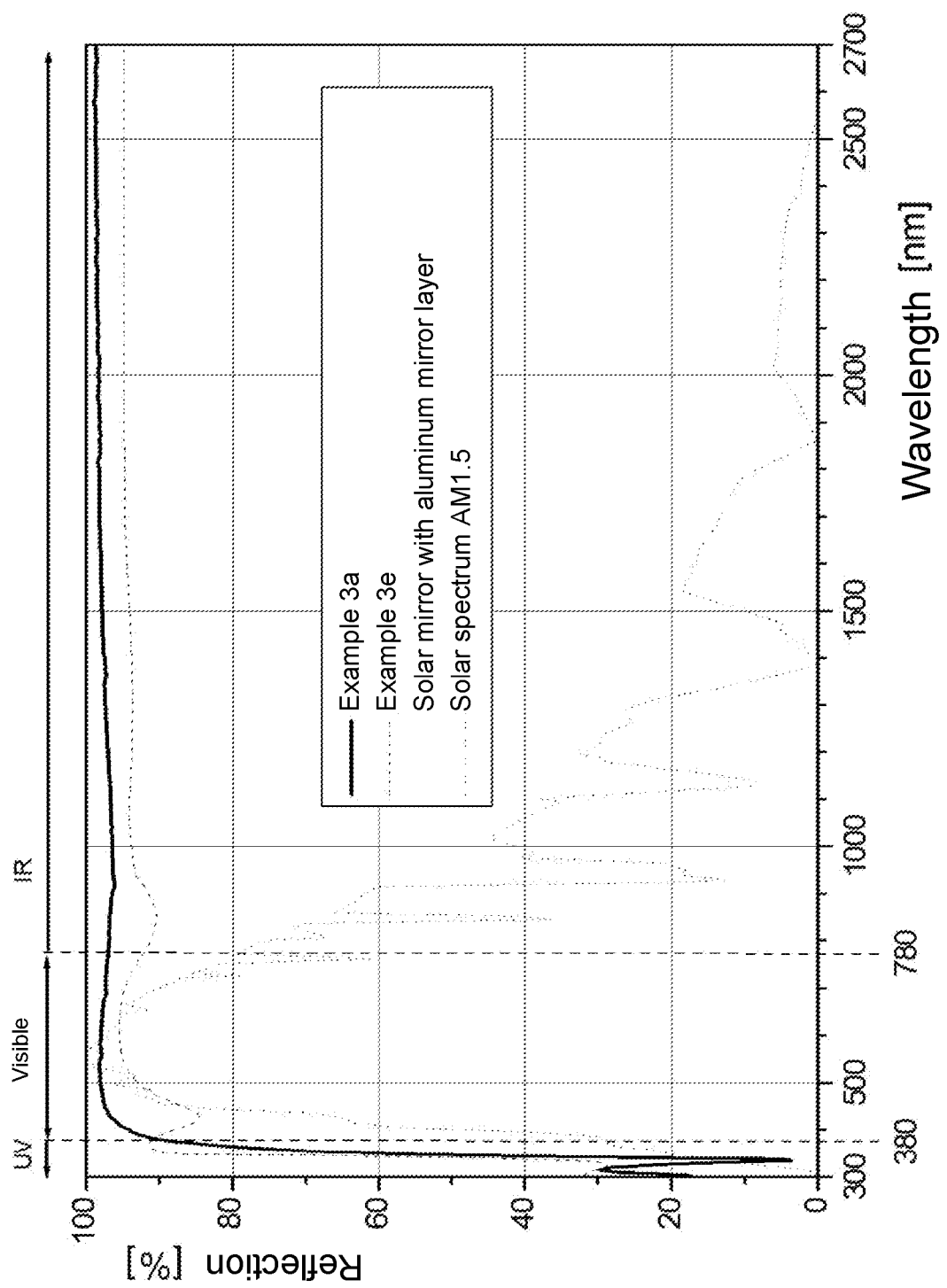
FIG. 4 is a graph showing a Solar spectrum AM1.5 and showing relationships between reflection (%) and wavelengths for layer systems according to the present disclosure and a solar mirror with an aluminum mirror layer.

This layer system has a solar reflection of more than 95% according to ASTM 891-87 and thus a significantly higher reflection than a solar mirror having a reflective aluminum layer, which has a solar reflection of only approx. 92% (see FIG. 4). Due to a proportion of diffuse reflection of under 6% according to DIN 5036-3 (1° of aperture), this surface mirror is particularly well suited as a solar reflector. The temperature stability is very good. In case of storage at a temperature of 250° C. for more than 1000 hours, the reflection decreases by maximally 2%.

EXAMPLE 3b

Solar Reflector with Sol-gel Protective Layer

The layer system further has a protective layer 11, especially preferred, is composed of SiOx deposited by means of sol-gel, in order to protect the system against abrasion and corrosion particularly well.

The layer system of Example 3b is listed in the following table:

| No. | Example 3b | Material | Layer thickness |
|---|---|---|---|
| 11 | Protective layer | Sol-Gel SiOx | 2-3 μm |
| 10 | HI layer with high refractive index n = 1.8-3.2 | TiOx | 50 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-30 nm |
| 5a | "Seed layer 1" | NiV 93:7% | 2-40 nm |
| 4 | Adhesive layer for silver and diffusion barrier | TiOx or TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

Figure 5:
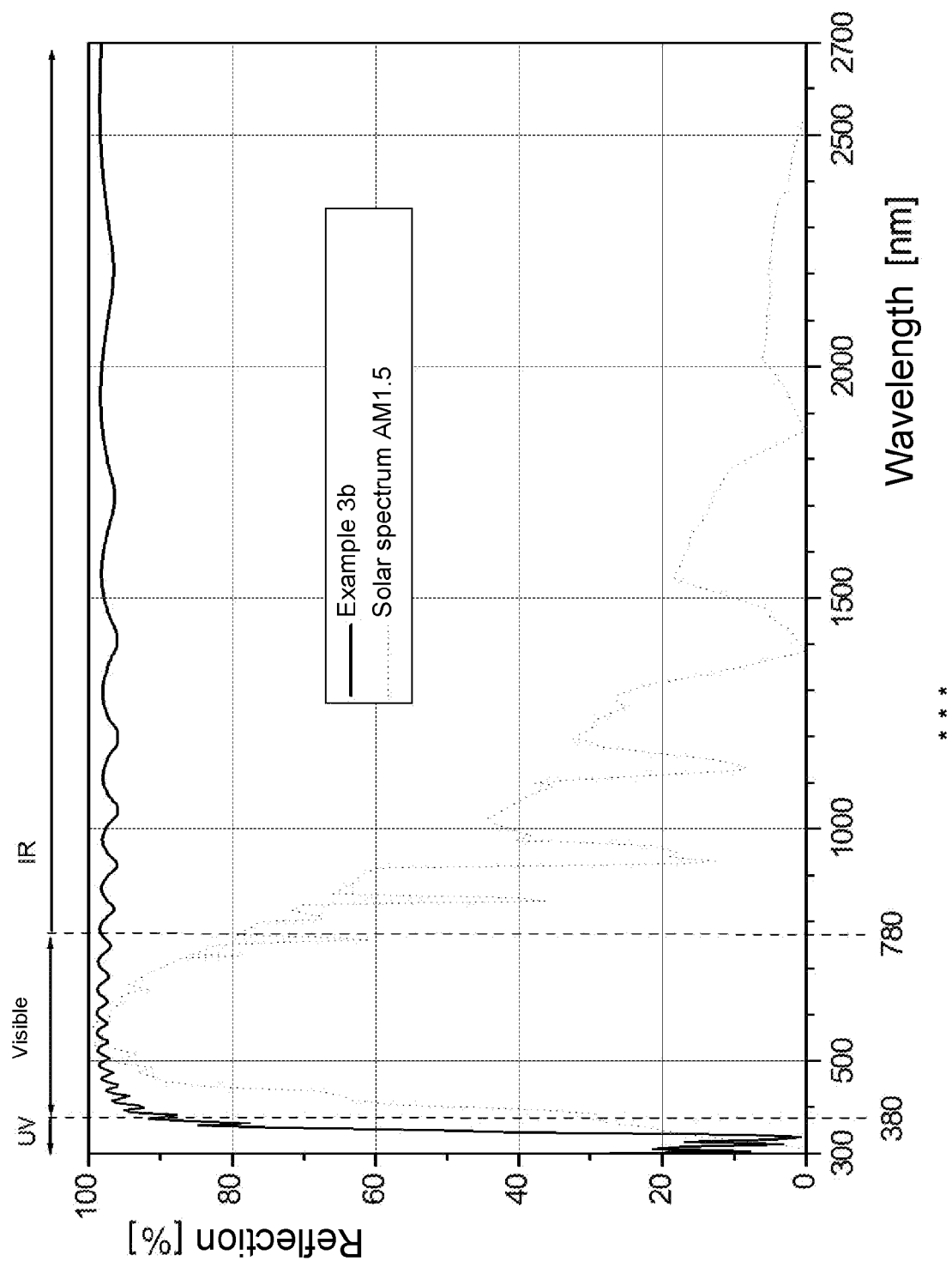
FIG. 5 is a graph showing a Solar spectrum AM1.5 and showing a relationship between reflection (%) and wavelengths for a layer system according to the present disclosure.

This layer system has a solar reflection of more than 92% according to ASTM 891-87 and a proportion of diffuse reflection of less than 6% according to DIN 5036-3 (1° of aperture) (see FIG. 5). The temperature stability is very good. In case of storage at a temperature of 250° C. for more than 1000 hours, the decrease of the total reflection is maximally 1%.

EXAMPLE 3c

Solar Reflector with Varnish Protective Layer

The layer system further has a protective layer 11 which, especially preferred, is made of a varnish and, even more preferred, of a fluoropolymer to protect the system particularly well against contamination and corrosion.

The layer system of Example 3c is listed in the following table:

| No. | Example 3c | Material | Layer thickness |
|---|---|---|---|
| 11 | Protective layer | Fluoropolymer | 0.5-8 μm |
| 10 | HI layer with high refractive index n = 1.8-3.2 | TiOx | 50 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOx or TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

This layer system has a solar hemispheric reflection of more than 91% according to ASTM 891-87.

EXAMPLE 3d

Solar Reflector for use in Glasshouses

For certain applications, it is beneficial to install solar mirrors in glasshouses where they are better protected against sandstorms. However, they have to withstand higher temperatures here (up to 90° C.) and, sometimes, a higher humidity (up to 90% relative humidity) than mirrors positioned outdoors. For these applications, in particular the following layer systems proved to be particularly resistant:

| No. | Example 3d-1 | Material | Layer thickness |
|---|---|---|---|
| 11 | Protective layer | | |
| 10 | HI layer with high refractive index n = 1.8-3.2 | TiOx | 50 nm |
| 9 | LI layer with low refractive index n = 1.3-1.8 | SiOx | 60 nm |
| 8 | Diffusion barrier | TiOx | 5-25 nm |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-30 nm |
| 5a | "Seed layer 1" | NiV% 93:7 | 2-40 nm |
| 4 | Adhesive layer for silver and diffusion barrier | TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

This layer system has a total reflection of more than 98% according to DIN 5036-3 and a solar reflection of more than 94% according to ASTM 891-87. In a "damp heat test" (85° C. at 85% humidity) for more than 1000 hours, the total reflection according to DIN 5036-3 and the solar reflection according to ASTM 891-87 both decreased maximally 1%.

| No. | Example 3d-2 | Material | Layer thickness |
|---|---|---|---|
| 11 | Protective layer | | |
| 10 | HI layer with high refractive index n = 1.8-3.2 | TiOx | 50 nm |
| 9 | LI layer with low refractive index n = 1.3-1.8 | SiOx | 50-60 nm |
| 8 | Diffusion barrier | | |
| 7 | Agglomeration protection layer | TiOx | 5-25 nm |
| 6 | Optically active, high-purity metal reflector layer | Ag | 90-200 nm |

| No. | Example 3d-2 | Material | Layer thickness |
|---|---|---|---|
| 5b | "Seed layer 2", sputtered layer made of material of the reflector layer | Ag | 2-30 nm |
| 5a | "Seed layer 1" | NiV 93:7% | 2-40 nm |
| 4 | Adhesive layer for silver and diffusion barrier | TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

This layer system has a total reflection of more than 98% according to DIN 5036-3 and a solar reflection of more than 94% according to ASTM 891-87.

In a "damp heat test" (85° C. at 85% humidity) for more than 1000 hours, the total reflection according to DIN 5036-3 and the solar reflection according to ASTM 891-87 both decreased maximally 1%.

| No. | Example 3d-3 | Material | Layer thickness |
|---|---|---|---|
| 11 | Protective layer | | |
| 10 | HI layer with high refractive index n = 1.8-3.2 | SiNx | 60 nm |
| 9 | LI layer with low refractive index n = 1.3-1.8 | SiOx | 60 nm |
| 8 | Diffusion barrier | | |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-30 nm |
| 5a | "Seed layer 1" | NiV 93:7% | 2-40 nm |
| 4 | Adhesive layer for silver and diffusion barrier | TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

It is particularly preferred to apply the silicon nitride layer (10) by means of a reactive sputtering process using a silicon target having an aluminum content of 1% (percent by weight). Nitrogen is introduced in this case as a reactive gas.

This layer system has a total reflection of more than 98% according to DIN 5036-3 and a solar reflection of more than 94% according to ASTM 891-87.

In a "damp heat test" (85° C. at 85% humidity) for more than 1000 hours, the total reflection according to DIN 5036-3 and the solar reflection according to ASTM 891-87 both decreased maximally 1%.

| No. | Example 3d-4 | Material | Layer thickness |
|---|---|---|---|
| 11 | Protective layer | | |
| 10 | HI layer with high refractive index n = 1.8-3.2 | ZAO | 62 nm |
| 9 | LI layer with low refractive index n = 1.3-1.8 | SiOx | 60 nm |
| 8 | Diffusion barrier | | |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-30 nm |
| 5a | "Seed layer 1" | NiV 93:7% | 2-40 nm |
| 4 | Adhesive layer for silver and diffusion barrier | TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

Herein, the ZAO layer (10) (zinc aluminum oxide) is applied preferably by means of a sputtering process. The aluminum content is particularly preferably 2% (percent by weight).

This layer system has a total reflection of more than 98% according to DIN 5036-3 and a solar reflection of more than 94% accoring to ASTM 891-87.

In a "damp heat test" (85° C. at 85% humidity) for more than 1000 hours, the total reflection according to DIN 5036-3 and the solar reflection according to ASTM 891-87 both decrease maximally 1%.

| No. | Example 3d-5 | Material | Layer thickness |
|---|---|---|---|
| 11 | Protective layer | | |
| 10 | HI layer with high refractive index n = 1.8-3.2 | ZAO | 62 nm |
| 9 | LI layer with low refractive index n = 1.3-1.8 | SiOx | 50-60 nm |
| 8 | Diffusion barrier | TiOx | 5-25 nm |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-30 nm |
| 5a | "Seed layer 1" | NiV 93:7% | 2-40 nm |
| 4 | Adhesive layer for silver and diffusion barrier | TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

The ZAO layer (10) (zinc aluminum oxide) is applied in this process preferably by means of a sputtering process. The aluminum content is particularly preferably 2% (percent by weight).

In addition, a TiOx diffusion barrier layer (8) is introduced.

This layer system has a total reflection of more than 98% pursuant to DIN 5036-3 and a solar reflection of more than 94% pursuant to ASTM 891-87.

In a "damp heat test" (85° C. at 85% humidity) for more than 1000 hours, the total reflection pursuant to DIN 5036-3 and the solar reflection pursuant to ASTM 891-87 both decrease maximally 1%.

EXAMPLE 3e

Solar Reflector with Aluminum Reflector Layer

| No. | Example 3e | Material | Layer thickness |
|---|---|---|---|
| 11 | Protective layer | | 0 |
| 10 | HI layer with high refractive index n = 1.8-3.2 | TiOx | 80 nm |
| 9 | LI layer with low refractive index n = 1.3-1.8 | SiOx | 60 nm |
| 8 | Diffusion barrier | | 0 |
| 7 | Agglomeration protection layer | CrOx | 2-10 nm |
| 6 | Optically active, high-purity metal reflector layer | Al | 90-200 nm |
| 5b | "Seed layer 2", sputtered layer made of material of the reflector layer | Al | 2-20 nm |
| 5a | "Seed layer 1" | NiV 93:7% | 2-40 nm |
| 4 | Adhesive layer for silver and diffusion barrier | TiOx or TiOxNy | 10-30 nm |
| 3 | Diffusion barrier | | |
| 2a | Anodization layer (sealed) | Al2O3 | 700-1200 nm |
| 1b | High-purity aluminum, roll-clad | Al 99.9% | 0.05-0.3 mm |
| 1a | Substrate | Aluminum alloy | 0.3-0.5 mm |
| 1c | Pure aluminum, roll-clad (optional) | | |
| 2b | Anodization layer | Al2O3 | 700-1200 nm |
| 12 | Optional insulation layer | | |

This layer system has a solar reflection of more than 89% accoring to ASTM 891-87 (see FIG. 4).

EXAMPLE 4

Mirrors for Color wheels in DLP (Digital Light Processing) Laser Projectors

The layer system of Example 4 is listed in the following table:

| No. | Example 4 | Material | Layer thickness |
|---|---|---|---|
| 11 | Protective layer | | 0 |
| 10 | HI layer with high refractive index n = 1.8-3.2 | ZrOx | 60-80 nm |
| 9 | LI layer with low refractive index n = 1.3-1.8 | SiOx | 60 nm |
| 8 | Diffusion barrier | TiOx | 5-25 nm |
| 7 | Agglomeration protection layer | CrOx | 2-10 nm |
| 6 | Optically active, high-purity metal reflector layer | Ag | 90-200 nm |
| 5b | "Seed layer 2", sputtered layer made of material of the reflector layer | Ag | 2-20 nm |
| 5a | "Seed layer 1" | NiV 93:7% | 2-40 nm |
| 4 | Adhesive layer for silver and diffusion barrier | TiOx or TiOxNy | 10-30 nm |
| 3 | Diffusion barrier | CrN | 10-30 nm |
| 2a | Anodization layer (sealed) | Al2O3 | 40-70 nm |
| 1b | High-purity aluminum, roll-clad | Al 99.9% | 0.05-0.3 mm |
| 1a | Substrate | Aluminum alloy | 0.4-0.7 mm |
| 1c | Pure aluminum, roll-clad (optional) | | |
| 2b | Anodization layer | Al2O3 | 40-70 nm |
| 12 | Optional insulation layer | | |

The invention claimed is:

1. A layered system, comprising:
   a metallic substrate having the following layers applied on a side of the metallic substrate thereof in the specified order:
   a first layer composed of a material of substoichiometric oxides or oxynitrides of titanium and zirconium or metals of titanium, zirconium, molybdenum, platinum, and chromium or an alloy using one of these metals or of at least two of these metals,
   a second layer, which is a seed layer, composed of a nickel alloy having chromium, aluminum, vanadium, molybdenum, cobalt, iron, titanium, and/or copper as an alloying partner, or composed of a metal of copper, aluminum, chromium, molybdenum, tungsten, tantalum, titanium, platinum, ruthenium, rhodium, or alloys using one of these metals, or of at least two of these metals, or composed of iron, steel or stainless steel,
   a third layer, which is an optically dense, high-purity metal reflector layer,
   a fourth layer selected from among substoichiometric oxides of titanium, zirconium, hafnium, vanadium, tantalum, niobium or chromium and from among metals of chromium, titanium, zirconium, hafnium, vanadium, niobium, tantalum, tungsten, molybdenum, rhodium, or platinum or alloys using one of these metals or at least two of these metals,
   a fifth layer, which is a LI layer having a lower refractive index than that of a directly adjoining HI layer, and
   a sixth layer, which is the HI layer directly adjoining said fifth layer, and said sixth layer having a higher refractive index than that of the fifth layer.

2. The layered system according to claim 1, wherein the metallic substrate comprises aluminum, copper or stainless steel.

3. The layered system according to claim 2, wherein the metallic substrate is composed of the following components:
   a core composed of aluminum, an aluminum alloy, copper, molybdenum, titanium, tantalum, stainless steel, steel, iron, tinplate or an alloy using at least one of these materials or of at least two of these materials, and
   an aluminum oxide layer on one side of the core or on both sides of the core.

4. The layered system according to claim 3, wherein said core is provided with a roll-cladding layer on one side facing incident electromagnetic radiation or on both sides, which is or are respectively arranged between said core and said aluminum oxide layer.

5. The layered system according to claim 4, wherein said roll-cladding layer consists of high-purity aluminum having an aluminum content of at least 99.5%.

6. The layered system according to claim 4, wherein either said core of the metallic substrate and/or said roll-cladding layer consists of aluminum and said aluminum oxide layer has been prepared through anodization.

7. The layered system according to claim 1, wherein
said first layer has a thickness of 5 to 50 nm,
said second layer has a thickness of 2 to 40 nm,
said third layer has a thickness in the range of 50 to 200 nm,
said fourth layer has a thickness of 2 to 20 nm,
said fifth layer has a thickness of 10 to 200 nm, and/or
said sixth layer has a thickness of 10 to 200 nm.

8. The layered system according to claim 1, wherein the material of said first layer is $TiO_x$, wherein x is <2, or $TiN_zO_y$, wherein z≤1 and y<2 and z+y has such a value that the titanium atom is formally not completely saturated.

9. The layered system according to claim 1, wherein the material of said second layer is non-ferromagnetic nickel alloy, stainless steel, or copper.

10. The layered system according to claim 1, wherein the high-purity metal reflector layer is a metal having a degree of purity of at least 99.9% and is silver, aluminum, gold, platinum, rhodium, molybdenum, or chromium, or an alloy using one of these metals or at least two of these metals.

11. The layered system according to claim 10, wherein the high-purity metal reflector layer is silver or aluminum.

12. The layered system according to claim 1, wherein said fourth layer is formed of substoichiometric chromium oxide or titanium oxide.

13. The layered system according to claim 1, wherein the refractive index n of said fifth layer is between 1.3 and 1.8 and the material of said sixth layer comprises a metal oxide, metal fluoride, metal nitride, metal oxynitride, or metal carbooxynitride.

14. The layered system according to claim 13, wherein the material of said fifth layer is $SiO_u$, wherein u is selected such that the compound is stoichiometric or substoichiometric, $Al_2O_3$, $MgF_2$, $AlF_3$, $CeF_3$, $YF_3$, $BaF_2$ $LaF_3$, $SiAlO_v$, wherein v is selected such that the compound is stoichiometric or substoichiometric, $TiAlO_w$, wherein w is selected such that the compound is stoichiometric or substoichiometric, or borosilicate glass.

15. The layered system according to claim 1, wherein the refractive index n of said sixth layer is between 1.8 and 3.2 and the material of said sixth layer comprises a metal oxide, metal fluoride, metal nitride, metal oxynitride, or metal carbooxynitride.

16. The layered system according to claim 15, wherein the material of said sixth layer is $TiO_r$, wherein r is selected such that the compound is stoichiometric or substoichiometric, $TiAlO_w$, $ZrO_s$, wherein s is selected such that the compound is stoichiometric or substoichiometric, $HfO_t$, wherein t is selected such that the compound is stoichiometric or substoichiometric, $La_2O_3$, $Y_2O_3$, $Bi_2O_3$, ZnO, $SnO_2$, Zinc Aluminum Oxide (ZAO), $Nb_2O_5$, $Y_2O_3$, or $Si_3N_4$.

17. The layered system according to claim 1, additionally comprising one or more of the following layers:
an additional layer composed of an inorganic metal compound between an aluminum oxide layer on one side of a core of the substrate facing incident electromagnetic radiation and said first layer,
a metal layer, applied through a PVD process, directly below said third layer,
a seventh layer having a chemical composition comprising $TiO_m$, $TiAl_nO_mN_p$, $TiO_mN_p$, $ZrO_m$, $ZrAl_nO_mN_p$, $ZrO_mN_p$, ZAO, ZnO, $Si_3N_4$, $Al_2O_3$, or $AlO_mN_p$, wherein the index m and the sum m+p have such a value that either the respective compound is stoichiometric compound or substoichiometric and n can assume a value of greater than 0 to 2 or more, formed between said fourth layer and said fifth layer, and
an outer protective finish layer.

18. The layered system according to claim 17, wherein
the additional layer has a thickness of 5 to 50 nm,
the metal layer has a thickness of 2 to 100 nm, and/or
the seventh layer has a thickness of 2 to 30 nm.

19. The layered system according to claim 17, wherein the additional layer comprises a nitride, an oxynitride, or ZAO.

20. The layered system according to claim 19, wherein the nitrides and oxynitrides of the additional layer are nitrides and oxynitrides of chromium, titanium, titanium-aluminum, or aluminum.

21. The layered system according to claim 17, wherein the metal layer grows on the condensation nuclei provided by the second layer and consists of the same metal as said third layer.

22. The layered system according to claim 21, wherein said metal layer is applied by sputtering.

23. The layered system according to claim 1, wherein the second layer consists of sputtered aluminum, and said third layer consists of vapor-deposited aluminum.

24. The layered system according to claim 17, wherein said outer protective finish layer is formed of a fluoride, oxide, oxynitride, oxycarbonitride, or diamond-like carbon (DLC).

25. The layered system according to claim 24, wherein the material of said outer protective finish layer is $LaF_3$, $ZrO_g$, $SiO_g$, $SiO_gN_hC_k$, $SnO_2$, $In_2O_3$, $SnInO_g$, $InZnO_g$ (ITO) or $ZnAlO_g$ (ZAO), wherein the index g as well as sum g+h+k have such a value that either the respective compound is stoichiometric compound or substoichiometric.

26. The layered system according to claim 24, wherein the material of said outer protective finish layer is a three-dimensional oxide applied via the sol-gel process.

27. The use of the layered system according to claim 1 as a surface reflector, as a solar reflector, or as a laser mirror.

28. The layered system according to claim 1, wherein the second layer consists of aluminum, the third layer is formed of aluminum and the second layer has been sputtered.

29. The layered system according to claim 1, wherein the metallic substrate has a core made of aluminum or an aluminum alloy, wherein the core is provided on one side facing the incident electromagnetic radiation or on both sides with a roll-cladding layer made of high-purity aluminum having an aluminum content of at least 99.5%, a first aluminum oxide layer is provided on the roll-cladding layer and a second aluminum oxide layer is provided on another side of the core,
wherein the following layers are arranged on the first aluminum oxide layer in the specified order from the inside of the layered system to the outside of the layered system:
the first layer 4, wherein the material of the first layer is $TiO_x$, wherein x is <2, or $TiN_zO_y$, wherein z≤1 and y<2 and z+y has such a value that the titanium atom is formally not completely saturated,
the second layer, wherein the material of the second layer is a non-ferromagnetic nickel alloy or copper,
the third layer wherein the material of the third layer is high-purity silver,
the fourth layer, wherein the fourth layer is formed of substoichiometric chromium oxide or titanium oxide,
the fifth layer, wherein the material of the fifth layer is $SiO_u$, wherein u is selected such that the compound is stoichiometric or substoichiometric, or $Al_2O_3$, and the sixth layer, wherein the material of the sixth layer is $TiO_r$, wherein r is selected such that the compound is stoichiometric or substoichiometric or $Nb_2O_5$.

* * * * *

UNITED STATES PATENT AND TRADEMARK OFFICE
CERTIFICATE OF CORRECTION

PATENT NO. : 10,436,955 B2
APPLICATION NO. : 15/522456
DATED : October 8, 2019
INVENTOR(S) : Reinhard Dasbach It is certified that error appears in the above-identified patent and that said Letters Patent is hereby corrected as shown below:

In the Specification

- Column 9, Line 8: there should be a "," between BaF2 and LaF3.
- Column 9, Line 27: insert --nm-- after "100".
- Column 9, Line 51: insert --nm-- after "100".
- Column 14, Line 62: delete "is" after "a".
- Column 19, in the table: it should read "1b'" instead of "1b".
- Column 24, in the table of Example 3d-1: it should read "NiV 93:7%" instead of "NiV% 93:7".

In the Claims

- Column 29, Line 34, Claim 14: there should be a "," between BaF2 and LaF3.

Signed and Sealed this
Fourteenth Day of April, 2020

Andrei Iancu
*Director of the United States Patent and Trademark Office*